United States Patent Office 2,744,112
Patented May 1, 1956

2,744,112

PREPARATION OF OPTICALLY ACTIVE 3-HYDROXY-N-METHYL-MORPHINANES

Karl Vogler, Basel, Switzerland, assignor to Hoffmann-La Roche Inc., Nutley, N. J., a corporation of New Jersey No Drawing. Application June 23, 1953, Serial No. 363,655

Claims priority, application Switzerland June 30, 1952

3 Claims. (Cl. 260—285)

Optically active 3-hydroxy-N-methyl-morphinanes have hitherto been obtained by splitting racemic 3-hydroxy-N-methyl-morphinane by means of tartaric acid into the optical antipodes (O. Schnider and A. Grüssner, Helvetica Chimica Acta, volume 34 [1951], page 2211). According to the said procedure the dextrorotatory 3-hydroxy-N-methyl-morphinane is isolated from the tartrate fraction crystalizing last; therefore, this dextrorotatory antipode evidently is not as optically pure as the levorotatory antipode which originates from the tartrate crystallizing first.

Dextrorotatory 3-hydroxy-N-methyl-morphinane as well as the ethers and esters thereof are useful as anticough and antirheumatic drugs, whereas levorotatory 3-hydroxy-N-methyl-morphinane is a highly active analgesic. Because of this divergent activity of the two antipodes, it is highly desirable for these compounds, more particularly for the dextrorotatory 3-hydroxy-N-methyl-morphinane, to be available in optically pure form.

The present invention now provides a process which makes it possible to prepare such optically active 3-hydroxy-N-methyl-morphinanes of high optical purity. The said new process comprises splitting racemic 1-(p-methoxybenzyl) - 2 - methyl - 1,2,3,4,5,6,7,8-octahydroisoquinoline by means of a suitable optically active acid, preferably D-(+)-tartaric acid, into its optical antipodes and cyclizing the said optically active 1-(p-methoxybenzyl) - 2 - methyl - 1,2,3,4,5,6,7,8-octahydroisoquinoline formed to the corresponding optically active 3-hydroxy-N-methyl-morphinane. The latter may advantageously be isolated as tartaric acid salts.

To split the racemic 1-(p-methoxybenzyl)-2-methyl-1,2,3,4,5,6,7,8-octahydroisoquinoline (O. Schnider and J. Hellerbach, Helvetica Chimica Acta, volume 33 [1950], page 1437) it is best to use a suitable, readily available optically active acid, preferably tartaric acid, the fractional crystallization being performed in water or, still better, in methanol. The fraction crystallizing first is the tartrate of the 1-(p-methoxybenzyl)-2-methyl-1,2,3,4,5,6,7,8-octahydroisoquinoline with levorotation in ether; this salt may be completely liberated by recrystallization from the diastereomeric tartrate of the 1-(p-methoxybenzyl)- 2 -methyl - 1,2,3,4,5,6,7,8-octahydroisoquinoline with dextrorotation in ether. When the said tartrate of the 1-(p-methoxybenzyl)-2-methyl-1,2,3,4,5,- 6,7,8-octahydroisoquinoline with levorotation in ether is cyclised by treatment with phosphoric acid, dextrorotatory 3-hydroxy-N-methyl-morphinane is formed; it is best isolated from the reaction mixture as tartaric acid salt. The free base may be obtained from the tartrate according to methods known per se.

The methanolic mother liquor, from which the tartrate of the 1-(p-methoxybenzyl)-2-methyl-1,2,3,4,5,6,7,8-octahydroisoquinoline with levorotation in ether has been separated off, is concentrated and the residue is recrystallized several times in acetone. The tartrate of the 1-(p-methoxybenzyl)- 2 -methyl - 1,2,3,4,5,6,7,8-octahydroisoquinoline with dextrorotation in ether is thus obtained in a pure state. It is then converted into the free base and the latter is cyclized to yield levorotatory 3-hydroxy-N-methyl-morphinane. The repeated recrystallization in acetone of the 1-(p-methoxybenzyl)-2-methyl-1,2,3,4,5,-6,7,8-octahydroisoquinoline-tartrate with dextrorotation in ether can of course not be performed without any losses. For the obtention of levorotatory 3-hydroxy-N-methyl-morphinane it is therefore preferable to cyclize the optically still impure 1-(p-methoxybenzyl)-2-methyl-1,2,3,4,-5,6,7,8-octahydroisoquinoline with dextrorotation in ether, as it results from the isolation of the levorotatory antipode during the splitting operation, and to purify the levorotatory 3-hydroxy-N-methyl-morphinane formed. The purication of the latter is easy, since it forms a tartrate which is more difficultly soluble in water than the tartrate of its antipode.

Example 1

75 parts by weight of recemic 1-(p-methoxybenzyl)-2-methyl-1,2,3,4,5,6,7,8-octahydroisoquinoline and 41.5 parts by weight of D-(+)-tartaric acid are dissolved on the steam bath in 425 parts by volume of methanol. After 24 hours' standing, the crystals formed are sucked off, the filtrate is concentrated and kept standing for some more time, whereupon the additional crystals formed are again sucked off. The two salt fractions obtained show the following data:

Fraction 1.—42 parts by weight, melting point 162–167° C.:
$[\alpha]_D^{20} = +47.6°$
($c=2$ in methanol).

Fraction 2.—12.5 parts by weight, melting point 165–168° C.:
$[\alpha]_D^{20} = +42°$
($c=2$ in methanol).

By recrystallization of these two fractions in methanol, the tartrate of 1-(p-methoxybenzyl)-2-methyl-1,2,3,4,5,6,-7,8-octahydroisoquinoline with levorotation in ether is obtained in a pure state. Melting point 173–174° C. $[\alpha]_D^{20} = +48.8°$ ($c=2$ in methanol).

The base obtained from the last named tartrate by addition of ammonia and extraction with ether is an oil with $[\alpha]_D^{20} = -78.5°$ ($c=3$ in ether).

15 parts by weight of the 1-(p-methoxybenzyl)-2-methyl-1,2,3,4,5,6,7,8-octahydroisoquinoline with levorotation in ether, as obtained above, are mixed with 15 parts by volume of 100% phosphoric acid and this mixture is maintained for 65 hours at 130° C. Thereupon 50 parts by volume of water are added and the mixture is heated for ½ hour in a steam bath. The mixture is diluted with additional 450 parts by volume of water, it is heated shortly to boiling with charcoal and filtered. The mixture is then adjusted to pH 9–10 by means of ammonia, the crude base is extracted with ether, the ether is eliminated by distillation and the residue is converted into the tartrate. The latter is dissolved in water and heated shortly to boiling with charcoal, the solution is filtered and the filtrate is brought to crystallization. The crystals of the monohydrate of the tartrate melt at 180–183° C. $[\alpha]_D^{20} = +35.5°$ ($c=2$ in water). The dextrorotatory 3-hydroxy-N-methyl-morphinane which may be obtained from the tartrate by usual methods melts at 197–198° C.; $[\alpha]_D^{20} = +56°$ ($c=1$ in methanol).

Example 2

The methanolic mother liquor, which remains back after the isolation of the difficultly soluble tartrate of the 1-(p-methoxybenzyl) - 2 - methyl - 1,2,3,4,5,6,7,8-octahydroisoquinoline with levorotation in ether according to Example 1, is liberated from the methanol by distillation, the residue is taken up in acetone and brought to crystallization by standing and by seeding. The tartrate of 1-(p - methoxybenzyl) - 2 - methyl-1,2,3,4,5,6,7,8-octahydroisoquinoline with dextrorotation in ether thus obtained my be purified by recrystallization in acetone. Melting point 130–132° C. $[\alpha]_D^{20} = -26°$ ($c=2$ in methanol). The 1-(p-methoxybenzyl)-2-methyl-1,2,3,4,5,6,7,8-octahydroisoquinoline with dextrorotation in ether obtained by methods known per se from this tartrate is an oil; $[\alpha]_D^{20} = +77.5°$ ($c=3$ in ether).

To obtain the levorotatory 3-hydroxy-N-methyl-morphinane, the said 1-(p-methoxybenzyl)-2-methyl-1,2,3,4,5,6,7,8-octahydroisoquinoline with dextrorotation in ether is cyclized by means of phosphoric acid according to Example 1 and the levorotatory 3-hydroxy-N-methyl-morphinane formed is isolated as the tartrate. The levorotatory 3-hydroxy-N-methyl-morphinane tartrate crystallizes as dihydrate and melts at 113–115° C.;

$$[\alpha]_D^{20} = -14° \ (c=3 \text{ in water})$$

The levorotatory 3-hydroxy-N-methyl-morphinane may be isolated from the said tartrate; it shows $[\alpha]_D^{20} = -56°$ ($c=1$ methanol) and melts at 198–199° C.

*Example 3*

The methanolic mother liquor, remaining back after having isolated according to Example 1 the difficultly soluble tartrate of the 1-(p-methoxybenzyl)-2-methyl-1,2,3,4,5,6,7,8-octahydroisoquinoline with levorotation in ether, is liberated from the methanol by distillation, the residue is dissolved in acetone and, without any intermediate crystallization, precipitated with ammonia and extracted with ether to isolate optically impure 1-(p-methoxybenzyl)-2-methyl - 1,2,3,4,5,6,7,8-octahydroisoquinoline with dextrorotation in ether. This optically impure base is cyclized according to Example 1, the crude base formed is converted into its tartrate and the latter is crystallized in water for purification purposes, the more easily soluble tartrate of the dextrorotatory 3-hydroxy-N-methyl-morphinane being thereby eliminated. The tartrate obtained crystallizes in the form of the dihydrate which melts at 113–115° C.; $[\alpha]_D^{20} = -14°$ ($c=3$ in water). The levorotatory 3-hydroxy-N-methylmorphinane, which is isolated from the said tartrate by methods known per se, melts at 198–200° C'; $[\alpha]_D^{20} = -56°$ ($c=1$ in methanol).

I claim:

1. A process which comprises reacting racemic 1-(p-methoxybenzyl) - 2 - methyl-1,2,3,4,5,6,7,8-octahydroisoquinoline with D-(+)-tartaric acid, fractionally crystallizing the reaction product in a solvent of the group consisting of water, methanol and mixtures of water and methanol, separating the tartrate of 1-(p-methoxybenzyl)-2-methyl-1,2,3,4,5,6,7,8-octahydroisoquinoline crystallizing out first, recrystallizing the same and cyclizing the purified product to form dextrorotatory 3-hydroxy-N-methyl-morphinane of high optical purity.

2. A process which comprises reacting racemic 1-(p-methoxybenzyl)-2 - methyl - 1,2,3,4,5,6,7,8-octahydroisoquinoline with D-(+)-tartaric acid, fractionally crystallizing the reaction product in a solvent of the group consisting of water, methanol and mixtures of water and methanol separating the tartrate of 1-(p-methoxybenzyl)-2-methyl-1,2,3,4,5,6,7,8-octahydroisoquinoline crystallizing out first, concentrating the mother liquor, converting the tartrate of 1-(p-methoxybenzyl)-2-methyl-1,2,3,4,5,-6,7,8-octahydroisoquinoline remaining back into the free base and cyclizing the latter to produce levorotatory 3-hydroxy-N-methyl-morphinane.

3. A process which comprises forming, in a solvent of the group consisting of water, methanol and mixtures of water and methanol, a solution containing racemic 1-(p-methoxybenzyl) - 2 - methyl-1,2,3,4,5,6,7,8-octahydroisoquinoline and an optically active tartaric acid, and crystallizing from said solution the less soluble of the pair of addition salts formed by said optically active acid with the optically active antipodes of said 1-(p-methoxybenzyl)-2-methyl-1,2,3,4,5,6,7,8-octahydroisoquinoline.

References Cited in the file of this patent

UNITED STATES PATENTS 2,524,855　Schnider et al. _____ Oct. 10, 1950

FOREIGN PATENTS 278,410　Switzerland _____ Feb. 16, 1952

OTHER REFERENCES

Schmidt: Textbook of Org. Chem. (6th ed., 1950), pp. 34–36.